(12) United States Patent
Loebig (10) Patent No.: US 11,834,989 B1
(45) Date of Patent: Dec. 5, 2023

(54) GAS TURBINE ENGINE INLET PARTICLE SEPARATORS WITH COATINGS FOR REBOUND CONTROL

(71) Applicant: Rolls-Royce Corporation, Indianapolis, IN (US)

(72) Inventor: James C. Loebig, Greenwood, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/841,283

(22) Filed: Jun. 15, 2022

(51) Int. Cl.
*F02C 7/052* (2006.01)
*B01D 45/04* (2006.01)

(52) U.S. Cl.
CPC ............. *F02C 7/052* (2013.01); *B01D 45/04* (2013.01); *F05D 2260/607* (2013.01)

(58) Field of Classification Search
CPC . F02C 7/05; F02C 7/052; B01D 45/04; F05D 2260/607; F05D 2230/90
See application file for complete search history.

(56) References Cited

U.S. PATENT DOCUMENTS

| | | | |
|---|---|---|---|
| 3,362,155 A * | 1/1968 | Driscoll | F02C 7/05 55/306 |
| 4,268,287 A | 5/1981 | Norris | |
| 6,702,873 B2 | 3/2004 | Hartman | |
| 7,678,165 B2 | 3/2010 | Tingle et al. | |
| 7,927,408 B2 | 4/2011 | Sheoran et al. | |
| 8,945,254 B2 | 2/2015 | Mayer et al. | |
| 9,206,740 B2 | 12/2015 | Wong et al. | |
| 9,631,554 B2 | 4/2017 | Howe et al. | |
| 9,638,103 B2 | 5/2017 | Howe et al. | |
| 9,709,275 B2 | 7/2017 | De Diego et al. | |
| 10,227,924 B2 | 3/2019 | Snyder et al. | |
| 10,480,413 B2 | 11/2019 | Snyder | |
| 10,724,436 B2 | 7/2020 | Mayer et al. | |
| 10,738,699 B2 | 8/2020 | Burnside | |
| 10,947,901 B2 | 3/2021 | Darling et al. | |
| 11,073,083 B2 | 7/2021 | Snyder et al. | |
| 2104/0144123 | 5/2014 | Judd et al. | |
| 2015/0377040 A1* | 12/2015 | Roberge | B64D 15/00 415/196 |
| 2016/0177824 A1 | 6/2016 | Ponton et al. | |

FOREIGN PATENT DOCUMENTS

| | | |
|---|---|---|
| CN | 109519282 | 3/2019 |
| CN | 110617149 | 12/2019 |

* cited by examiner

*Primary Examiner* — Steven M Sutherland
(74) *Attorney, Agent, or Firm* — Barnes & Thornburg LLP (57) ABSTRACT

An inlet duct for a gas turbine engine includes a particle separator, a scavenge duct, and a layer of material having a low coefficient of restitution. The particle separator including an outer wall spaced, an inner wall, and a splitter located radially between the outer wall and the inner wall. The scavenge duct is coupled with particle separator. The layer of material is located on at least one of the outer wall, the splitter, and the scavenge duct.

19 Claims, 6 Drawing Sheets

GAS TURBINE ENGINE INLET PARTICLE SEPARATORS WITH COATINGS FOR REBOUND CONTROL

FIELD OF THE DISCLOSURE

The present disclosure relates generally to gas turbine engines, and more specifically to air-inlet ducts included in gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and the resulting fuel-air mixture is ignited. Products of the combustion reaction in the combustor are directed into the turbine where work is extracted to drive the compressor and, sometimes, an output shaft. Left-over products of the combustion reaction are exhausted out of the turbine and may provide thrust in some applications.

Air is drawn into the engine through an air inlet and communicated to the compressor via an air-inlet duct. In some operating conditions, particles such as dust, sand, ash, ice, or liquid water may be entrained in the air and may be drawn into the air inlet and passed through the air-inlet duct to the compressor. Such particles may impact components of the compressor and turbine causing unintended wear. This unintended wear may decrease power output of the engine, decrease surge margin, shorten the life span of the engine, and lead to increased maintenance costs and increased down time of the engine.

SUMMARY

The present disclosure may comprise one or more of the following features and combinations thereof.

An air-inlet duct for a gas turbine engine includes a particle separator, a scavenge duct, and a layer of material having a low coefficient of restitution. The particle separator is formed to include an inlet passageway for receiving a stream of air, a compressor passageway that extends downstream from the inlet passageway, and a scavenge passageway that extends downstream from the inlet passageway. The particle separator is configured to receive atmospheric air laden with particles and to direct the particles into the scavenge passageway while allowing the atmospheric air to move into the compressor passageway thereby reducing a number of particles that enter the compressor passageway.

The particle separator includes an outer wall, an inner wall, and a splitter. The outer wall is spaced apart from an engine rotation axis. The inner wall is located radially between the outer wall and the engine rotation axis to define the inlet passageway between the inner wall and the outer wall. The splitter is located radially between the outer wall and the inner wall. The splitter includes an outer splitter surface that cooperates with the outer wall to define the scavenge passageway and an inner splitter surface cooperating with the inner wall to define the compressor passageway.

The scavenge duct is coupled with an outlet of the scavenge passageway to receive a flow of air from the scavenge passageway. The scavenge duct has a radially extending duct wall that faces directly the outlet of the scavenge passageway. The layer of material having a low coefficient of restitution is located along at least one of the outer wall of the particle separator, the outer splitter surface of the splitter, and the radially extending duct wall of the scavenge duct to reduce a velocity of the particles that bounce off the outer wall, the outer splitter surface, or the radially extending wall and prevent the particles from entering the compressor passageway.

In some embodiments, the layer of material is located only on the radially extending duct wall of the scavenge duct to block the particles that have entered the scavenge duct from bouncing off of the duct wall and escaping out of the scavenge duct through the scavenge passageway. In some embodiments, the layer of material is located at least on the radially extending duct wall of the scavenge duct to block the particles that have entered the scavenge duct from bouncing off of the duct wall and escaping out of the scavenge duct through the scavenge passageway.

In some embodiments, the air-inlet duct includes a vane located in the scavenge passageway. The layer of material may be located on the vane to block the particles that have entered the scavenge duct from bouncing off of the vane and escaping out of the scavenge passageway.

In some embodiments, the layer of material is a film coating. The film coating is applied to the at least one of the outer wall of the particle separator, the outer splitter surface of the splitter, and the radially extending duct wall of the scavenge duct.

In some embodiments, the layer of material is applied with adhesive to the at least one of the outer wall of the particle separator, the outer splitter surface of the splitter, and the radially extending duct wall of the scavenge duct. In some embodiments, the layer of material comprises a polymeric material. In some embodiments, the layer of material comprises at least one of urethane and polyurethane.

According to an aspect of the present disclosure, a gas turbine engine includes an engine core and an air-inlet duct. The engine core includes a compressor configured to compress air, a combustor configured to mix fuel with compressed air from the compressor to form a fuel-air mixture and to ignite the fuel-air mixture, and a turbine configured to extract work from combusted products of the fuel-air mixture. The air-inlet duct includes a particle separator, a scavenge duct, and a first layer of material having a low coefficient of restitution.

The particle separator is formed to include an inlet passageway for receiving a stream of air, a compressor passageway that extends downstream from the inlet passageway, and a scavenge passageway that extends downstream from the inlet passageway. The scavenge duct is coupled to the particle separator to receive a portion of the stream of air from an outlet of the scavenge passageway. The first layer of material is located in the scavenge duct to block particles in the portion of the stream of air from bouncing out of and escaping the scavenge duct.

In some embodiments, the particle separator includes a vane located in the scavenge passageway and a second layer of material having a coefficient of restitution. The second layer of material is located on the vane to block the particles that have entered the scavenge duct from bouncing off of the vane and escaping out of the scavenge passageway.

In some embodiments, the first layer of material is a film coating applied to a wall of the scavenge duct that faces directly the outlet of the scavenge passageway. In some embodiments, the first layer of material is applied with adhesive to a wall of the scavenge duct that faces directly the outlet of the scavenge passageway. In some embodiments, the first layer of material comprises at least one of urethane and polyurethane.

In some embodiments, the particle separator includes an outer wall, an inner wall, and a splitter. The outer wall is spaced apart from an engine rotation axis. The inner wall is located radially between the outer wall and the engine rotation axis to define the inlet passageway. The splitter is located radially between the outer wall and the inner wall. The splitter includes an outer splitter surface that cooperates with the outer wall to define the scavenge passageway and an inner splitter surface cooperating with the inner wall to define the compressor passageway.

In some embodiments, the particle separator further includes a second layer of material having the low coefficient of restitution located on at least one of the outer wall and the outer splitter surface. In some embodiments, a wall of the scavenge duct faces directly the outlet of the scavenge passageway and the first layer of material is applied only to the wall.

In some embodiments, the first layer of material has a thickness of between about 0.005 inches and 0.05 inches. In some embodiments, the first layer of material has a thickness of between about 0.010 inches and 0.015 inches.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
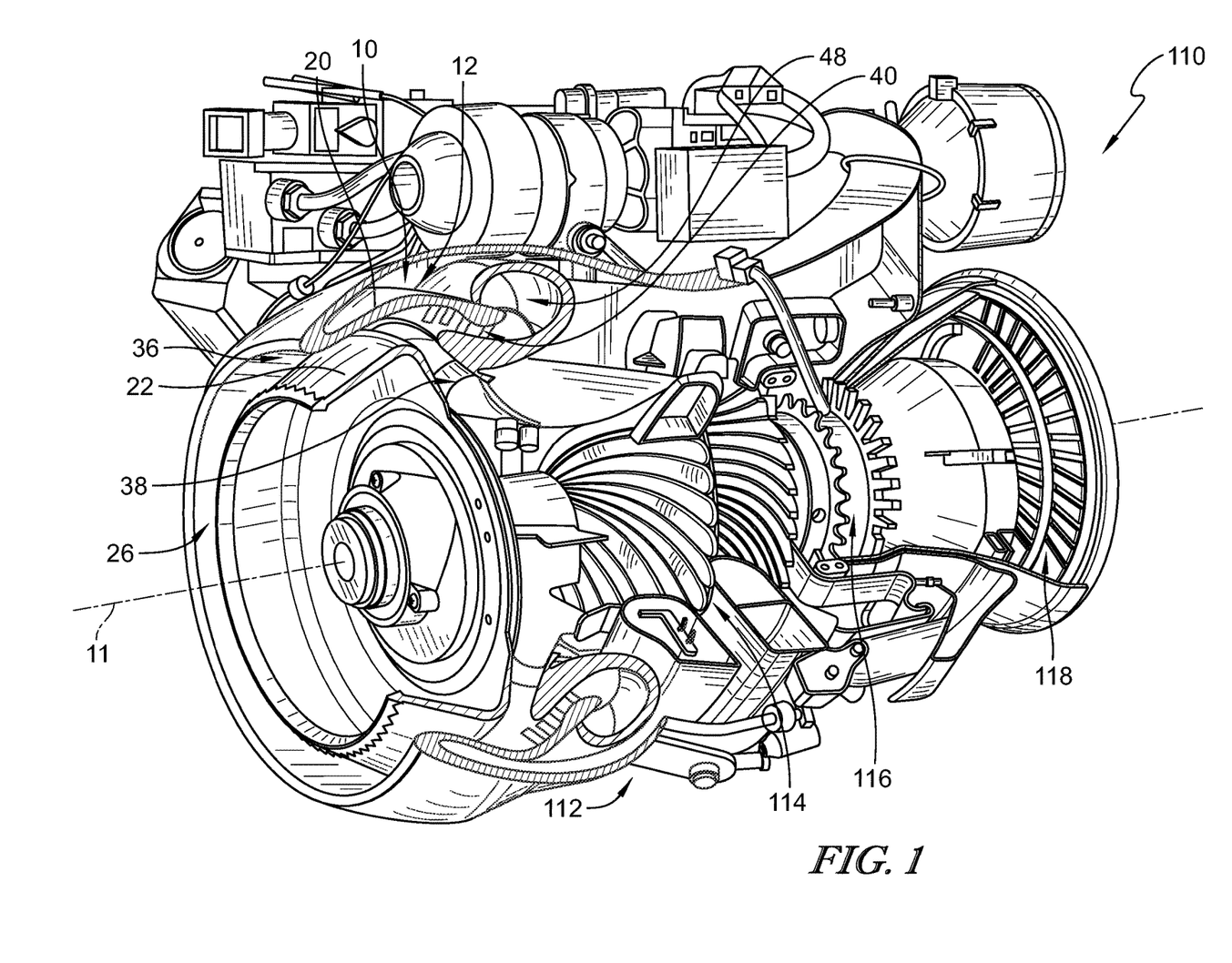
FIG. 1 is a cut-away perspective view of a gas turbine engine showing that the gas turbine engine includes an air-inlet duct adapted to conduct air entering the gas turbine engine into a compressor included in the gas turbine engine.

A gas turbine engine 110 in accordance with the present disclosure is shown, for example, in FIG. 1. The gas turbine engine 110 includes an air-inlet duct 10 and an engine core 112. The engine core 112 is made up of a compressor 114, a combustor 116, and a turbine 118. Air is drawn into the gas turbine engine 110 through the air-inlet duct 10 prior to admission of the air into the compressor 114 as suggested in FIGS. 1 and 2. In some environments, particles such as dirt, sand, ash, ice, or liquid water may be entrained in the air and carried into the gas turbine engine 110. The air-inlet duct 10 is configured to separate the particles from the air to cause clean air, generally free from particles, to be delivered to the compressor 114 so that damage to the compressor 114 and the turbine 118 can be reduced.

Figure 2:
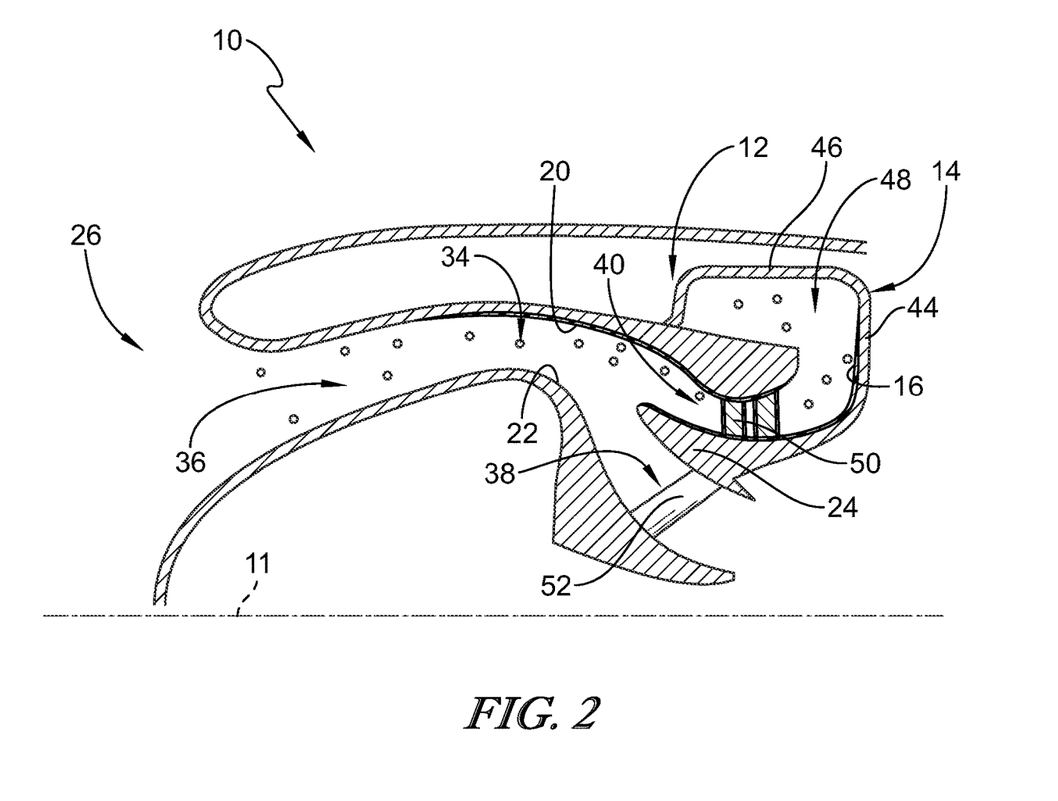
FIG. 2 is an enlarged partial view of FIG. 1 showing the air-inlet duct of the gas turbine engine, the air-inlet duct including a particle separator, a scavenge duct configured to conduct dirty air laden with particles away from an engine core of the gas turbine engine, and a layer of material with a low coefficient of restitution applied in the air-inlet duct to block particles from bouncing out of the scavenge duct and into the passageway to the engine core and also to prevent particles from bouncing off of the outer wall and into the engine core.
Figure 3:
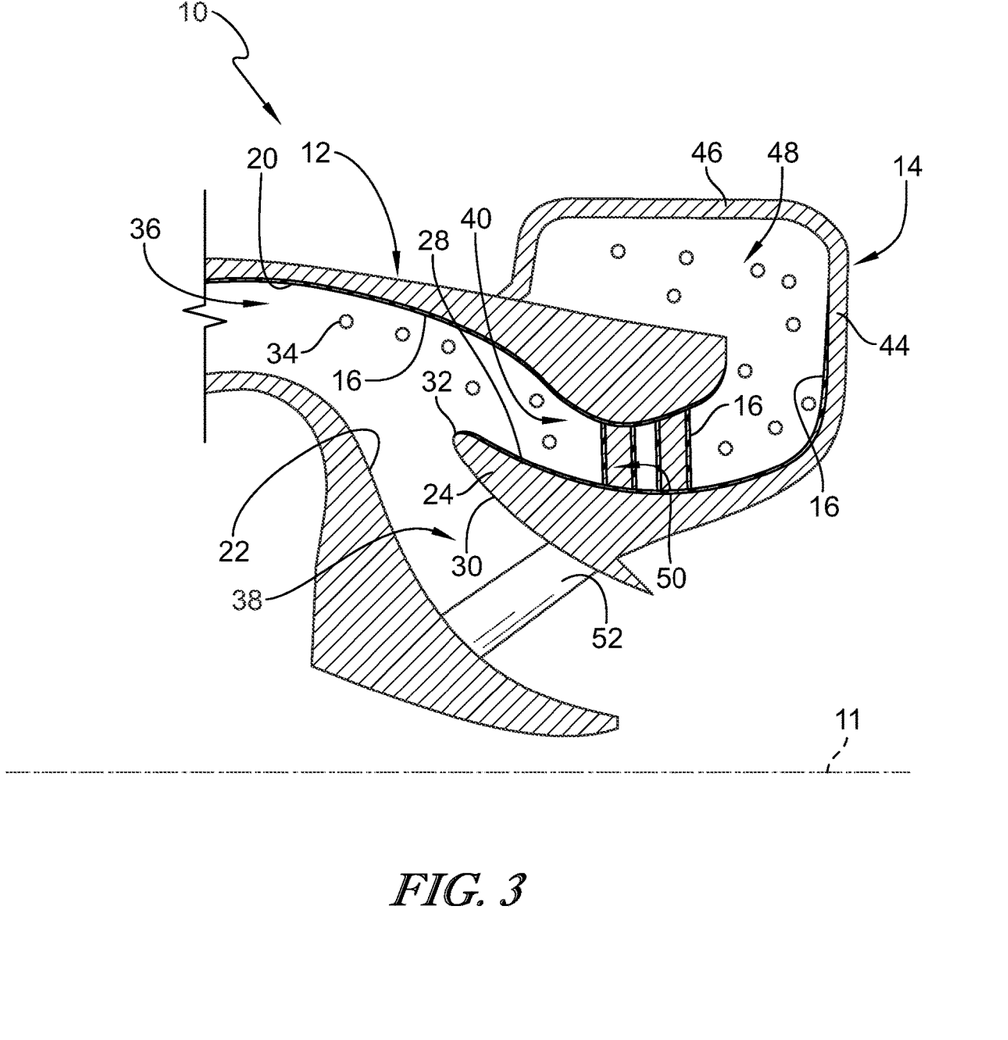
FIG. 3 is an enlarged portion of FIG. 2 showing the layer of material with a low coefficient of restitution applied to an outer wall and vanes of the particle separator and to a radially extending wall of the scavenge duct in the air-inlet duct.

The air-inlet duct 10 illustratively includes a particle separator 12, a scavenge duct 14, and a layer of material 16 having a low coefficient of restitution as shown in FIGS. 2 and 3. The particle separator 12 is configured to receive atmospheric air laden with particles 34 and to direct a first portion of the air with the particles 34 away from the compressor 114 while directing a second portion of the air, generally free of particles, toward the compressor 114 thereby reducing the number of particles 34 that enter the compressor 114.

The particle separator 12 of the illustrative embodiment includes an outer wall 20, an inner wall 22, and a splitter 24 as shown in FIGS. 2 and 3. The outer wall 20 is located radially in spaced-apart relation to an engine rotation axis 11. The inner wall 22 is located radially between the outer wall 20 and the engine rotation axis 11. The inner wall 22 and the outer wall 20 cooperate to define an inlet passageway 36 therebetween. The inlet passageway 36 is located at an inlet 26 of the gas turbine engine 110.

The splitter 24 is located radially between the outer wall 20 and the inner wall 22 as shown in FIG. 2. The splitter 24 includes an outer splitter surface 28 and an inner splitter surface 30 as shown in FIG. 3. The outer splitter surface 28 cooperates with the outer wall 20 to define a scavenge passageway 40 therebetween. The inner splitter surface 30 cooperates with the inner wall 22 to define a compressor passageway 38 therebetween. The outer splitter surface 28 is coupled to the inner splitter surface 30 at a splitter tip 32. The particle separator 12 is illustratively an inertial particle separator shaped so that particles entrained in the air are carried by their inertia into the scavenge passageway 40 while generally clean air is conducted into the compressor 114 as suggested in FIGS. 2 and 3.

The scavenge duct 14 is coupled with the particle separator 12 and configured to conduct the air with particles 34 away from the compressor 114 and typically discharges the air to ambient air. Scavenge blowers may be used prior to discharging the air to draw air flow through the scavenge duct 14. The layer of material 16 having the low coefficient of restitution is applied to areas of the particle separator and/or the scavenge duct to reduce a velocity of the particles 34 striking the layer of material 16 so as to prevent the particles from bouncing into the a path of air for the compressor 114 instead of into the desired path leading through the scavenge duct 14. As a result of the layer of material 16 reducing the unwanted bouncing, the number of particles 34 directed into the compressor 114 is reduced. In some embodiments, no particles 34 are passed into the compressor 114.

The layer of material 16 having a low coefficient of restitution is located on areas of the scavenge duct 14 and/or the particle separator 12 in certain locations to reduce particles 34 bouncing off of a surface and into the compressor passageway 38. The layer of material 16 is a coating in the illustrative embodiments. In other embodiments, the layer of material 16 is applied as a tape with an adhesive material. In some embodiments, the layer of material 16 has a thickness of between about 0.005 inches and 0.05 inches. In some embodiments, the layer of material 16 has a thickness of between about 0.010 inches and 0.015 inches. In some embodiments, the layer of material 16 has a thickness of equal to or greater than 0.001 inches.

The layer of material 16 has a coefficient of restitution that is less than a coefficient of restitution of the inner wall 22 in the illustrative embodiment. The layer of material 16 has a coefficient of restitution that is less than a coefficient of restitution of the outer wall 20 in the illustrative embodiment. The layer of material 16 has a coefficient of restitution that is less than a coefficient of restitution of the scavenge duct and scavenge duct vane in the illustrative embodiment. The layer of material 16 has a coefficient of restitution that is less than a coefficient of restitution of the splitter surfaces 28, 30 in the illustrative embodiment. In some embodiments, the layer of material 16 comprises at least one of urethane and polyurethane. In some embodiments, the layer of material 16 comprises a polymeric material. In some embodiments, the layer of material 16 is a fluorelastomer. IN some embodiments, the layer of material 16 has porosity.

In some embodiments, the coefficient of restitution of the layer of material 16 is less than about 0.75. In some embodiments, the coefficient of restitution of the layer of material 16 is less than about 0.6. In some embodiments, the coefficient of restitution of the layer of material 16 is less than about 0.5. In some embodiments, the coefficient of restitution of the layer of material 16 is less than about 0.4. In some embodiments, the coefficient of restitution of the layer of material 16 is less than about 0.3. In some embodiments, the coefficient of restitution of the layer of material 16 is less than about 0.25. In some embodiments, the coefficient of restitution of the layer of material 16 is less than about 0.2. In some embodiments, the coefficient of restitution of the layer of material 16 is less than about 0.1. In some embodiments, the coefficient of restitution of the layer of material is less than about 0.05.

The inner wall 22 forms a centerbody of the air-inlet duct 10 as shown in FIG. 2. A layer of material 17 having a high coefficient of restitution may be applied to the inner wall 42 along the inner wall 22 at the inlet passageway 36 as shown in FIG. 2. The layer of material 17 having the high coefficient of restitution may help bounce particles 34 away from and out of the inlet passageway 36 such that less particle 34 need to be separated by the splitter 24. The layer of material 17 has a coefficient of restitution greater than a coefficient of restitution of the inner wall 22.

The scavenge duct 14 is located at an outlet of the scavenge passageway 40 as shown in FIGS. 2 and 3. The scavenge duct 14 includes a radially extending wall 44 and an axially extending wall 46 that extends axially away from a radially outward end of the radially extending wall 44. The radially extending wall 44 conducts the air laden with particles radially outward away from the compressor 114 and other engine components. The scavenge duct 14 wraps around the primary flowpath of the engine and extends radially inward in some locations. The particles may be conducted radially inward in such locations. The axially extending wall 46 cooperates with the radially extending wall 44 to define a cavity 48 for collecting the air laden with particles and for discharging the air through a blower and then an outlet of the scavenge duct 14. Illustratively, the radially extending wall 44 is generally perpendicular to a direction of the scavenge passageway 40. The radially extending wall 44 faces directly the outlet of the scavenge passageway 40.

The radially extending wall 44 is angled generally perpendicular relative to a direction of the air exiting the outlet of the scavenge passageway 40. The radially extending wall 44 is angled at an incline of about or greater than about 60 degrees relative to a direction of the air exiting the outlet of the scavenge passageway 40. In some embodiments, the radially extending wall 44 is angled at an incline of about or greater than about 75 degrees relative to a direction of the air exiting the outlet of the scavenge passageway 40. In some embodiments, the radially extending wall 44 is angled at an incline of about or greater than about 80 degrees relative to a direction of the air exiting the outlet of the scavenge passageway 40. In some embodiments, the radially extending wall 44 is angled at an incline of about or greater than about 90 degrees relative to a direction of the air exiting the outlet of the scavenge passageway 40.

In conventional particle separators, particles in the air may strike the radially extending wall 44 of the scavenge duct and bounce back through the scavenge passageway 40 and into the compressor passageway 38 due to the angle of the trajectory of the particles and the upright nature of the radially extending wall 44. In the present disclosure, the layer of material 16 having a low coefficient of restitution is located along the radially extending wall 44 of the scavenge duct 14 as shown in FIGS. 2 and 3. In some embodiments, the entire scavenge duct 14 is coated with the layer of material 16.

Figure 4:
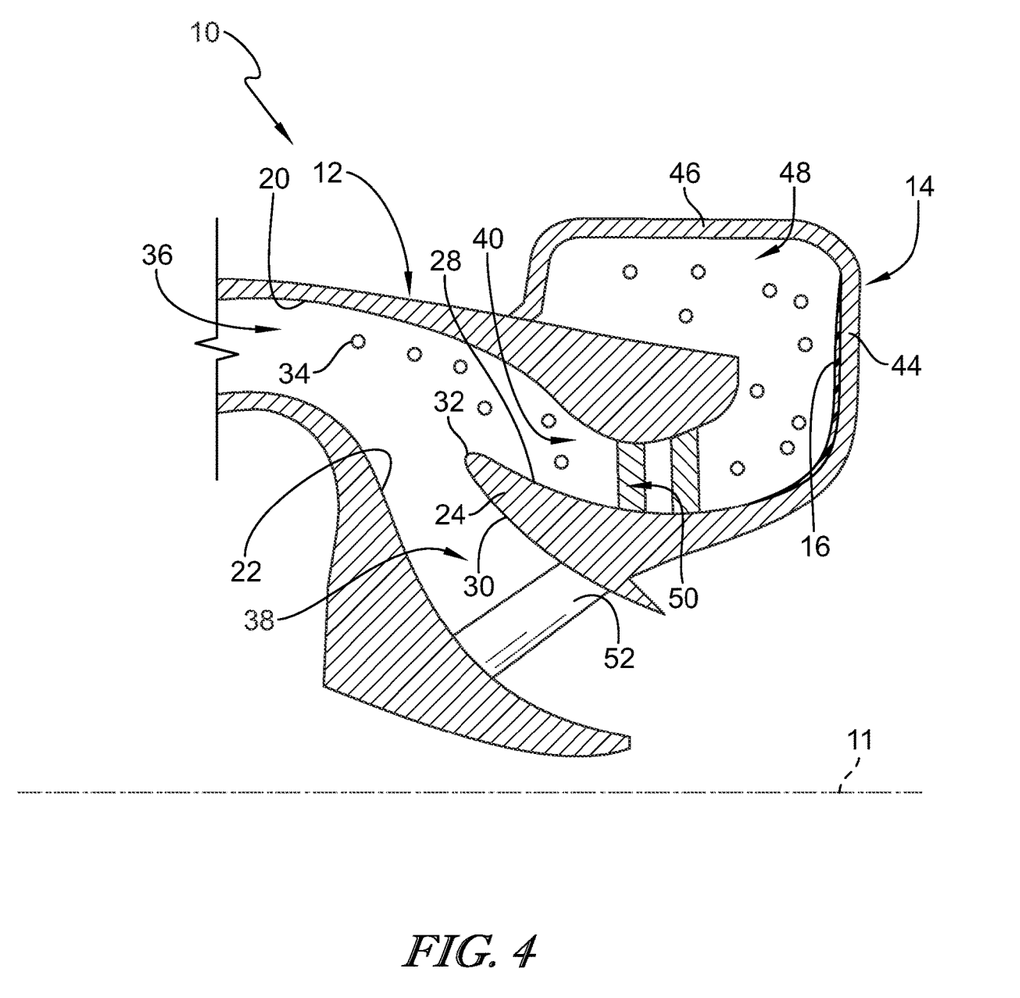
FIG. 4 is an enlarged view similar to FIG. 3 showing the layer of material with a low coefficient of restitution applied only to the radially extending wall of the scavenge duct in the air-inlet duct to block the particles from bouncing off of the radially extending wall and into the engine core.

Particles 34 exiting the scavenge passageway 40 may continue in their direction of travel and strike the radially extending wall 44 because of the inertia of the particles 34 instead of flowing smoothly radially outward with a majority of the airflow. The layer of material 16 located on the radially extending wall 44 of the scavenge duct 14 reduce the velocity of the particles 34 striking the radially extending wall 44. As a result, the number of particles that bounce off of the radially extending wall 44 and travel forward back through the scavenge passageway 40 and into the compressor passageway 38 is reduced. In some embodiments, the layer of material 16 having a low coefficient of restitution is located only along the radially extending wall 44 of the scavenge duct 14 as shown in FIG. 4.

Figure 5:
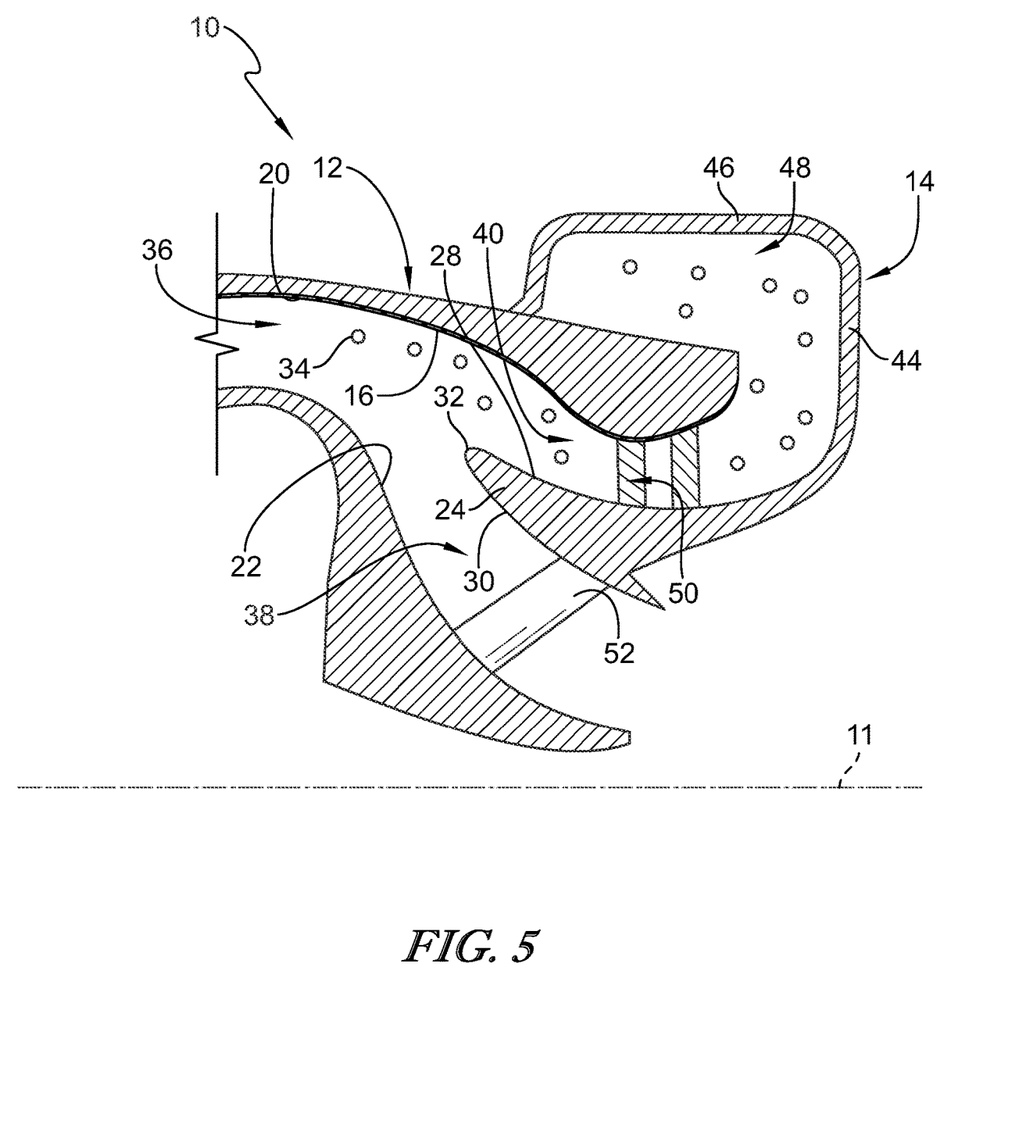
FIG. 5 is an enlarged view similar to FIG. 3 showing the layer of material with a low coefficient of restitution applied only to the outer wall of the particle separator in the air-inlet duct to block the particles from bouncing off of the outer wall and into the engine core.

In some embodiments, the layer of material 16 is applied to the outer wall 20 forward of and/or or aft of the splitter tip 32 as shown in FIGS. 2 and 3. The layer of material 16 applied to the outer wall 20 reduces a velocity of the particles 34 striking the outer wall 20 and, as a result, reduces the number of particles bouncing off the outer wall 20 with enough velocity and direction to enter the compressor passageway 38. In some embodiments, the layer of material 16 is located only along the outer wall 20 as shown in FIG. 5. In some embodiments, the layer of material 16 is located on the outer splitter surface 28 as shown in FIGS. 2 and 3. In some embodiments, the layer of material 16 is located only along the outer splitter surface 28. Illustratively, the layer of material 16 is applied forward of and aft of the splitter tip 32 as shown in FIGS. 2 and 3. In some embodiments, the layer of material 18 is applied to the outer wall forward of the splitter tip 32, but not aft of the splitter tip. In some embodiments, the layer of material 18 is applied to the outer wall aft of the splitter tip 32, but not forward of the splitter tip. In some embodiments, the layer of material 18 is applied to a discrete axial distance on the outer wall axially near the splitter tip 32.

Figure 6:
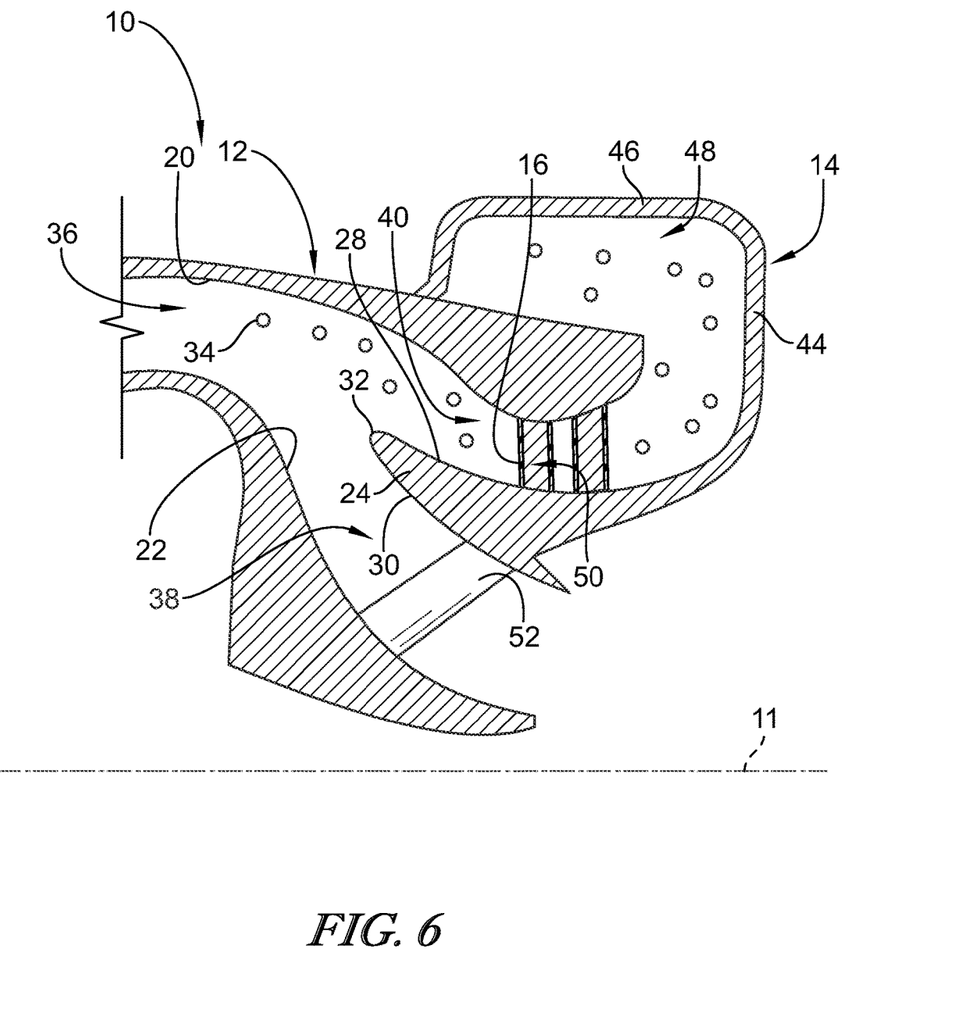
FIG. 6 is an enlarged view similar to FIG. 3 showing the layer of material with a low coefficient of restitution applied only to the plurality of vanes in the scavenge passageway of the air-inlet duct to block the particles from bouncing off of the vanes and into the engine core.

The illustrative particle separator 12 further includes a plurality of airfoil shaped vanes 50 located in the scavenge passageway 40 and a plurality of airfoil shaped vanes 52 located in the compressor passageway 38 as shown in FIGS. 2 and 3. The layer of material 16 having the low coefficient of restitution is located on an external surface of the plurality of vanes 50 located in the scavenge passageway 40 to reduces the number of particles bouncing off the vanes 50 with enough velocity and direction to enter the compressor passageway 38. In some embodiments, the layer of material 16 is located only along the plurality of vanes 50 as shown in FIG. 6. In other embodiments, the layer of material 16 is applied to any combination of the outer wall 20, the outer splitter surface 28, the radially extending wall 44 of the scavenge duct 14, and the plurality of vanes 50.

Conventional inlet particle separators (IPS) for aircraft may not perform with sufficient separation efficiency to fully reduce the engine damage accumulated by operating in austere environments. One cause of particle separation inefficiency in conventional particle separators is high rebound energy (coefficient of restitution, COR) of particles off of certain surfaces of the inlet particle separator. Metallic (e.g Ti-6Al-4V, commercially pure Ti, and Al alloys) and composite (e.g. Fiberglass with epoxy matrix) surfaces impacted by sand (quartz primarily, feldspar's second, then many other minerals) have coefficient's of restitution which may be too high and cause incoming sand to rebound into the compressor passageway 38 which delivers airflow into the compressor 114 and engine core.

According to the present disclosure, to prevent large ingestion into the compressor 114 and engine core, at least a portion of the scavenge duct 14 and/or the scavenge vanes 50 are coated with a layer of materials 16 which have a low coefficient of restitution to prevent rebound out of scavenge passageway 40 or out of the scavenge duct 14 and into the compressor passageway 38. Furthermore, in some embodiments, the outer wall 20 and/or outer splitter surface 28 is treated with the layer 16 of low coefficient of restitution material in order to prevent sand particle rebound off the outer wall 20 and directly into the compressor passageway 38.

In some embodiments, the layer of material 16 having the low coefficient of restitution can be one or more of a tape, film, or a spray on coating. Potential candidates for the layer of material 16 are impact or erosion resistant materials containing urethane or polyurethane which have elastomeric properties and are either fully dense or contain porosity which aid in energy absorption when impacted by particles in the 4 micrometer to 1000 micrometer size range.

In other embodiments, the inner wall/centerbody 22 or a portion thereof is coated with a hard, high coefficient of restitution material in order to encourage rebound away from the splitter toward the scavenge passageway 40 so that smaller particles can enter the scavenge duct 14 as suggested in FIG. 2.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An air-inlet duct for a gas turbine engine, the air-inlet duct comprising
a particle separator formed to include an inlet passageway for receiving a stream of air, a compressor passageway that extends downstream from the inlet passageway, and a scavenge passageway that extends downstream from the inlet passageway, the particle separator configured to receive atmospheric air laden with particles and to direct the particles into the scavenge passageway while allowing the atmospheric air to move into the compressor passageway thereby reducing a number of particles that enter the compressor passageway, the particle separator including:
an outer wall spaced apart from an engine rotation axis,
an inner wall located radially between the outer wall and the engine rotation axis to define the inlet passageway between the inner wall and the outer wall, and
a splitter located radially between the outer wall and the inner wall, the splitter including an outer splitter surface that cooperates with the outer wall to define the scavenge passageway and an inner splitter surface cooperating with the inner wall to define the compressor passageway;
a scavenge duct coupled with an outlet of the scavenge passageway to receive a flow of air from the scavenge passageway, the scavenge duct having a radially extending duct wall that faces directly the outlet of the scavenge passageway; and
a layer of material having a low coefficient of restitution located along at least one of the outer wall of the particle separator, the outer splitter surface of the splitter, and the radially extending duct wall of the scavenge duct to reduce a velocity of the particles that bounce off the outer wall, the outer splitter surface, or the radially extending wall and prevent the particles from entering the compressor passageway,
wherein the layer of material is located at least on the radially extending duct wall of the scavenge duct to block the particles that have entered the scavenge duct from bouncing off of the duct wall and escaping out of the scavenge duct through the scavenge passageway.

2. The air-inlet duct of claim 1, wherein the layer of material is located only on the radially extending duct wall of the scavenge duct to block the particles that have entered the scavenge duct from bouncing off of the duct wall and escaping out of the scavenge duct through the scavenge passageway.

3. The air-inlet duct of claim 1, further comprising a vane located in the scavenge passageway and the layer of material is located on the vane to block the particles that have entered the scavenge duct from bouncing off of the vane and escaping out of the scavenge passageway.

4. The air-inlet duct of claim 1, wherein the layer of material is a film coating applied to the at least one of the outer wall of the particle separator, the outer splitter surface of the splitter, and the radially extending duct wall of the scavenge duct.

5. The air-inlet duct of claim 1, wherein the layer of material is applied with adhesive to the at least one of the outer wall of the particle separator, the outer splitter surface of the splitter, and the radially extending duct wall of the scavenge duct.

6. The air-inlet duct of claim 1, wherein the layer of material comprises at least one of urethane, fluoroelastomer, and polyurethane and the layer of material is at least one of fully dense and including porosity.

7. An air-inlet duct for a gas turbine engine, the air-inlet duct comprising
a particle separator formed to include an inlet passageway for receiving a stream of air, a compressor passageway that extends downstream from the inlet passageway, and a scavenge passageway that extends downstream from the inlet passageway, the particle separator configured to receive atmospheric air laden with particles and to direct the particles into the scavenge passageway while allowing the atmospheric air to move into the compressor passageway thereby reducing a number of particles that enter the compressor passageway, the particle separator including:
an outer wall spaced apart from an engine rotation axis,
an inner wall located radially between the outer wall and the engine rotation axis to define the inlet passageway between the inner wall and the outer wall, and
a splitter located radially between the outer wall and the inner wall, the splitter including an outer splitter surface that cooperates with the outer wall to define the scavenge passageway and an inner splitter surface cooperating with the inner wall to define the compressor passageway;
a scavenge duct coupled with an outlet of the scavenge passageway to receive a flow of air from the scavenge passageway, the scavenge duct having a radially extending duct wall that faces directly the outlet of the scavenge passageway; and
a layer of material having a low coefficient of restitution located along at least one of the outer wall of the particle separator, the outer splitter surface of the splitter, and the radially extending duct wall of the scavenge duct to reduce a velocity of the particles that bounce off the outer wall, the outer splitter surface, or the radially extending wall and prevent the particles from entering the compressor passageway,
further comprising a vane located in the scavenge passageway and the layer of material is located on the vane to block the particles that have entered the scavenge duct from bouncing off of the vane and escaping out of the scavenge passageway.

8. A gas turbine engine comprising
an engine core including a compressor configured to compress air, a combustor configured to mix fuel with compressed air from the compressor to form a fuel-air mixture and to ignite the fuel-air mixture, and a turbine configured to extract work from combusted products of the fuel-air mixture, and
an air-inlet duct including a particle separator, a scavenge duct, and a first layer of material having a low coefficient of restitution, the particle separator formed to include an inlet passageway for receiving a stream of air, a compressor passageway that extends downstream from the inlet passageway, and a scavenge passageway that extends downstream from the inlet passageway, the scavenge duct coupled to the particle separator to receive a portion of the stream of air from an outlet of the scavenge passageway, and the first layer of material being located in the scavenge duct to block particles in the portion of the stream of air from bouncing out of and escaping the scavenge duct.

9. The gas turbine engine of claim 8, wherein the particle separator further includes a vane located in the scavenge passageway and a second layer of material having a coefficient of restitution is located on the vane to block the particles that have entered the scavenge duct from bouncing off of the vane and escaping out of the scavenge passageway.

10. The gas turbine engine of claim 8, wherein the first layer of material is a film coating applied to a wall of the scavenge duct that faces directly the outlet of the scavenge passageway.

11. The gas turbine engine of claim 8, wherein the first layer of material is applied with adhesive to a wall of the scavenge duct that faces directly the outlet of the scavenge passageway.

12. The gas turbine engine of claim 8, wherein the first layer of material comprises at least one of urethane and polyurethane.

13. The gas turbine engine of claim 8, wherein the particle separator includes an outer wall spaced apart from an engine rotation axis, an inner wall located radially between the outer wall and the engine rotation axis to define the inlet passageway, and a splitter located radially between the outer wall and the inner wall, the splitter including an outer splitter surface that cooperates with the outer wall to define the scavenge passageway and an inner splitter surface cooperating with the inner wall to define the compressor passageway.

14. The gas turbine engine of claim 13, wherein the inner wall forms a centerbody of the air-inlet duct and a second layer of material having a high coefficient of restitution that is greater than a coefficient of restitution of the inner wall is applied to the inner wall at least in the inlet passageway.

15. The gas turbine engine of claim 8, wherein the particle separator further includes a second layer of material having the low coefficient of restitution located on at least one of the outer wall and the outer splitter surface.

16. The gas turbine engine of claim 8, wherein a wall of the scavenge duct faces directly the outlet of the scavenge passageway and the first layer of material is applied only to the wall.

17. The gas turbine engine of claim 8, wherein the first layer of material has a thickness of between 0.005 inches and 0.05 inches.

18. The gas turbine engine of claim 17, wherein the first layer of material has a thickness of between 0.010 inches and 0.015 inches.

19. The gas turbine engine of claim 8, wherein the first layer of material is applied via spray process.

* * * * *